United States Patent [19]

Parton et al.

[11] Patent Number: 5,316,904
[45] Date of Patent: May 31, 1994

[54] AMIDE SUBSTITUTED DYE COMPOUNDS AND SILVER HALIDE PHOTOGRAPHIC ELEMENTS CONTAINING SUCH DYES

[75] Inventors: Richard L. Parton, Webster; David A. Stegman, Churchville; Frederick J. Sauter, Rochester, all of N.Y.

[73] Assignee: Eastman Kodak Company, Rochester, N.Y.

[21] Appl. No.: 978,589

[22] Filed: Nov. 19, 1992

[51] Int. Cl.$^5$ .................. G03C 1/035; G03C 1/14

[52] U.S. Cl. .................. 430/567; 430/582; 430/583; 430/584; 430/586; 430/587; 430/588

[58] Field of Search ............... 430/567, 582, 583, 584, 430/586, 587, 588

[56] References Cited

U.S. PATENT DOCUMENTS

| | | | |
|---|---|---|---|
| 2,778,823 | 1/1957 | Brooker et al. | 260/240.6 |
| 3,617,269 | 11/1971 | Verhille et al. | 96/1.7 |
| 3,764,340 | 10/1973 | Shiba et al. | 96/124 |
| 3,770,449 | 11/1973 | Shiba et al. | 96/124 |
| 3,814,609 | 6/1974 | Shiba et al. | 96/124 |
| 3,832,189 | 8/1974 | Shiba et al. | 96/124 |
| 3,852,066 | 12/1974 | Levy | 96/1.6 |
| 3,865,598 | 2/1975 | Shiba et al. | 96/125 |
| 3,918,979 | 11/1975 | Sato et al. | 96/137 |
| 4,434,226 | 2/1984 | Wilgus et al. | 430/567 |
| 4,546,074 | 10/1985 | Kamei et al. | 430/573 |
| 4,555,482 | 11/1985 | Inoue et al. | 430/574 |
| 4,607,005 | 8/1986 | Urata | 430/550 |
| 4,659,654 | 4/1987 | Metoki et al. | 430/567 |
| 4,689,292 | 8/1987 | Metoki et al. | 430/567 |
| 4,701,405 | 10/1987 | Takiguchi et al. | 430/567 |
| 4,704,351 | 11/1987 | Takiguchi et al. | 430/567 |
| 4,800,154 | 1/1989 | Okazaki et al. | 430/583 |
| 5,032,500 | 7/1991 | Ikeda et al. | 430/583 |

FOREIGN PATENT DOCUMENTS

| | | |
|---|---|---|
| 0264788 | 4/1988 | European Pat. Off. |
| 59-77435 | 5/1984 | Japan .................. 430/588 |

OTHER PUBLICATIONS

JP 1252-545-A (Abstract) Green Sensitive Silver Halide Photographic Material—Contg. Magenta Coupler and Two Kinds of Sensitized Dye.
T874,015 (Defensive Publication) Supersensitized Silver Halide Photographic Emulsions.
T874,014 (Defensive Publication) Supersensitized Silver Halide Photographic Emulsions.
T874,010 (Defensive Publication) Supersensitized Silver Halide Photographic Emulsions.
T874,009 (Defensive Publication) Supersensitized Silver Halide Photographic Emulsions.
T874,008 (Defensive Publication) Supersensitized Silver Halide Photographic Emulsions.
T874,016 (Defensive Publication) Supersensitized Silver Halide Photographic Emulsions.
T875,013 (Defensive Publication) Supersensitized Silver Halide Photographic Emulsions.
JP 1007-041-A (Abstract) Silver Halide Colour Photographic Material—Contg. Triazolo:Pyrazole Coupler(s) and Carbocyanine Spectral Sensitizer(s).

Primary Examiner—Janet C. Baxter
Attorney, Agent, or Firm—Gordon M. Stewart

[57] ABSTRACT

Dyes and photographic elements containing them as silver halide sensitizing dyes, which dyes have the structure:

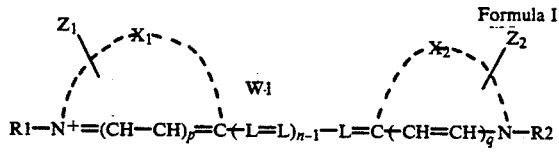

Formula I $$R_1-N^+=(CH-CH)_p=C(L=L)_{n-1}-L=C(CH=CH)_q-N-R_2$$

wherein:
X1 and X2 each independently represent the atoms necessary to complete a benzo-condensed 5- or 6-membered heterocyclic nucleus, which, in addition to being substituted by Z1 and Z2 respectively, may be further substituted or unsubstituted;
n is a positive integer from 1 to 4,
p and q each independently represents 0 or 1,
each L independently represents a substituted or unsubstituted methine group,
R1 and R2 each independently represents substituted or unsubstituted aryl or substituted or unsubstituted alkyl,
Z1 represents a substituent which contains both an amide group and an aromatic ring which may be appended or fused to X1; and
W1 is a counterion as needed to balance the charge of the molecule.

21 Claims, No Drawings

AMIDE SUBSTITUTED DYE COMPOUNDS AND SILVER HALIDE PHOTOGRAPHIC ELEMENTS CONTAINING SUCH DYES

FIELD OF THE INVENTION

This invention relates to dyes and silver photographic elements containing such dyes as sensitizing dyes.

BACKGROUND OF THE INVENTION

Silver halide photography usually involves the exposure of silver halide photographic element with light in order to form a latent image that is developed during photographic processing to form a visible image. Silver halide is intrinsically sensitive only to light in the blue region of the spectrum. In order to sensitize the silver halide to other than the blue region, sensitizing dyes are used in the silver halide emulsion. Sensitizing dyes are chromophoric compounds (usually cyanine dye compounds). Their usual function is to adsorb to the silver halide and to absorb light (usually other than blue light) and transfer that energy via an electron to the silver halide grain thus, rendering the silver halide sensitive to radiation of a wavelength other than the blue intrinsic sensitivity. However, sensitizing-dyes can also be used to augment the sensitivity of silver halide in the blue region of the spectrum.

Generally a sensitizing dye should wash out of the film or paper during processing. Any retained dye contributes to Dmin and this is often referred to as sensitizing dye stain. Dye stain, which adversely affects the image recorded in the photographic material, has been a source of concern for many years. The problem of retained sensitizing dye stain has been aggravated by the advent of new emulsions, such as tabular grains, which have more surface area and use higher dye levels and accordingly tend to give higher levels of dye stain. Additionally, the use of high chloride emulsions makes preferable the use of sensitizing dyes having enhanced adsorption to silver halide since sensitizing dyes tend to be inherently less well adsorbed to silver chloride emulsions. This can also lead to higher levels of dye stain. Such high chloride emulsions are also often subjected to rapid processing, which can further aggravate dye stain problems.

In order to reduce dye stain, stain-reducing agents, such as bis-triazine stilbene compounds, also known as optical brighteners, have been used to reduce dye stain. These compounds, however, are expensive and can be difficult to incorporate in the hydrophilic layers of photographic materials. Another method for reducing dye stain in some cases, is to incorporate certain substituents into the dye molecule to reduce dye stain. For example, dyes containing N,N'-2-hydroxy-3-sulfopropyl nitrogen substituents (J. Gotze, et al., U.S. Pat. No. 3,424,586) are generally less retained than the corresponding dyes with 3-sulfopropyl groups. Other stain-reducing nitrogen substituents have also been disclosed such as the 2-sulfoethylcarbamoylmethyl groups disclosed in U.S. Pat. No. 5,091,298 to Parton et al.

Although the foregoing dye structure modifications can be effective at reducing dye stain they have not eliminated the problem. New substituents are always desirable which will result in dyes with low dye stain. In addition, there is an important class of green sensitizers for which it is not possible to use these types of stain-reducing nitrogen substituents. In particular, benzoxazole dyes (an example is given in Formula A below) are commonly used to afford green sensitization in many photographic products such as color negative and reversal films, and color paper.

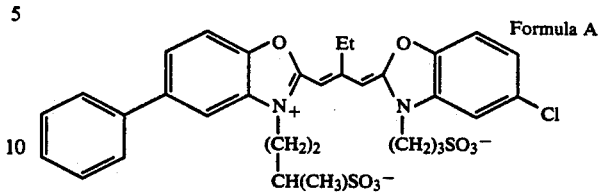

Formula A

In many instances, benzoxazole dyes also produce undesirable post-process stain. However, it has not been possible to incorporate the aforementioned stain-reducing nitrogen substituents on these dyes because the benzoxazole nucleus is too reactive. For instance, attempts to place a 2-hydroxy-3-sulfopropyl substituent, a 2-sulfoethylcarbamoylmethyl or similar group on the benzoxazole nucleus result in ring-opening of the benzoxazole. Thus, alternative stain reducing substituents are especially needed for dyes containing the benzoxazole nucleus.

It is thus an object of this invention to provide new dye compounds useful as sensitizing dyes for silver halide photographic elements, which dyes have relatively low dye stain. It is a further object of this invention to provide new benzoxazole sensitizers which exhibit relatively low dye stain.

SUMMARY OF INVENTION

The present invention provides cyanine dyes of the structure:

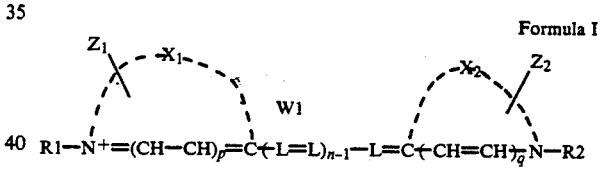

Formula I wherein:
X1 and X2 each independently represent the atoms necessary to complete a benzo-condensed 5- or 6-membered heterocyclic nucleus, which, in addition to being substituted by Z1 and Z2 respectively, may be further substituted or unsubstituted;
n is a positive integer from 1 to 4,
p and q each independently represents 0 or 1,
each L independently represents a substituted or unsubstituted methine group,
R1 and R2 each independently represents substituted or unsubstituted aryl or substituted or unsubstituted alkyl,
Z1 represents a substituent which contains both an amide group and an aromatic ring which may be appended or fused to X1; and
W1 is a counterion as needed to balance the charge of the molecule.

Photographic elements of the above described structure with the defined Z1 substituents, produce good sensitizing and low dye stain, particularly in a color format, than corresponding dyes not having a substituent of the Z1 type.

The present invention further provides silver halide photographic elements comprising a sensitizing dye of formula I.

DETAILED DESCRIPTION OF EMBODIMENTS OF THE INVENTION

In dyes of the type of formula I, it will be understood that the term "amide" when used without reference to substituent locations on such a group, broadly refers to a group containing the atoms —CON— and includes carbamoyl groups, although either term when used with reference to substituents may be limited to specific structural arrangements. For example, Z1 is preferably is an arylamide or arylcarbamoyl. This means that Z1 preferably has either of the respective structures (each of which is broadly an "amide"):

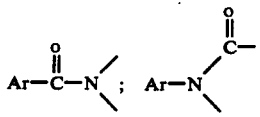

wherein the Ar (an aromatic ring) may be further bonded. The definition of aromatic rings is described in J. March, *Advanced Organic Chemistry*, Chapter 2, (1985, John Wiley & Sons). The aromatic ring can be a hydrocarbon or heterocyclic. Examples of Z1 include those where the aromatic ring is phenyl, furan-2-yl, furan-3-yl, 1-H-pyrrol-2-yl, 1-H-pyrrol-3-yl, thiophen-2-yl or thiophen-3-yl. Furthermore, the aromatic ring of Z1 or Z2 may be appended or fused to X1 or X2, or may be indirectly bonded thereto for example, through a substituted or unsubstituted group although any linking group should preferably maintain the relatively planar shape of the Z1-X1 group. For example, the linking group is an alkylene group. Further, any chain linking the aromatic ring of Z1 or Z2 to X1 or X2 is preferably no more than 4, 3 or 2 atoms in length (including the N and C of an amide group).

The photographic element which contains dyes of the present invention may particularly be those of a type which preferably have a water-immiscible dispersion into which the sensitizing dye can at least partially migrate. For example, the photographic element may be a color photographic element having a layer (usually, but not necessarily the same layer which contains silver halide and the sensitizing dye) which contains a color coupler dispersion into which the dye could at least partially migrate.

Preferably the sensitizing dyes have the formula:

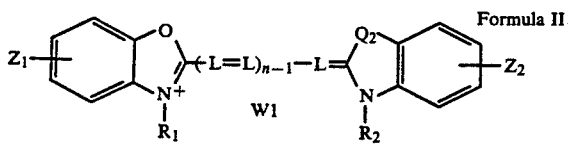

Formula II in which Q1 and Q2 are, independently, O, N, S or Se. Dyes of structure II are particularly useful when at least one nucleus is a benzoxazole (that is, at least Q1 or Q2 is O) or, more preferably, when both nuclei are benzoxazoles. Z1 is preferably a 5-position substituent, that is Z1 is positioned as shown:

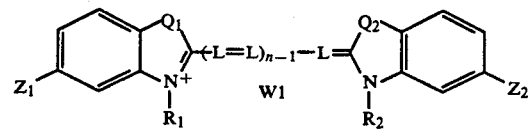

preferably has one of the following structures:

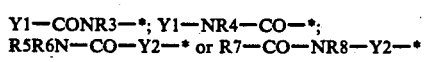

wherein * represents the bonding position to X1; Y1 and Y2 are substituted or unsubstituted aromatic groups and R3, R4, R5, R6, R7 and R8 are independently substituted or unsubstituted lower alkyl. By "lower alkyl" is meant having 1 to 6 carbon atoms. Y1, for example, may be a substituted benzene, furan, pyrrole or thiophene ring and Y2 may be a substituted benzene ring.

The structure of sensitizing dyes of the present invention are further preferably of the form:

Formula III

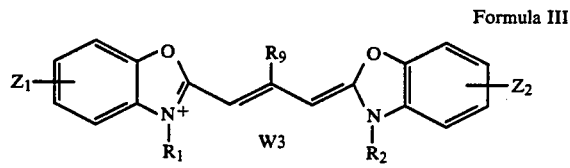

In formula III R1, R2, Z1 and Z2 may be as already defined, although it is preferred that R1 and R2 represent lower alkyl each substituted with an acid or acid salt group. R9 may include H, alkyl, alkylene, alkoxy and the like, but is preferably a lower alkyl. In addition Z1 may be a substituent which contains both an aromatic and an amide group, and Z2 is H or another substituent which is preferably non-aromatic (for example, a halogen such as chlorine or fluorine). Z1 and Z2 are preferably on the 5-position of their respective rings, that is the formula would be:

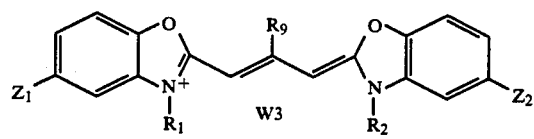

Further, Z1 may more specifically be of the formula:

in which * indicates the point of attachment to the benzene ring of the nucleus, and Y1 may be as already defined or may more specifically be phenyl, furan-2-yl, 1-H-pyrrol-2-yl, 1-H-pyrrol-3-yl, thiophen-2-yl or thiophene-3-yl; and Y2 is 1,4-phenylene or 1,3-phenylene, G is acetamido. Additionally, Z2 may be a halogen.

In any of the above formulae, X1 and X2 may independently be a nucleus which is a benzothiazole, benzoxazole, benzoselenazole, benzotellurazole, quinoline, benzimidazole, napthothiazole, napthiazole, or napthotellurazole. Any of those nuclei may be substituted with known substituents, such as halogen (e.g., chloro, fluoro, bromo), hydroxy, alkoxy (e.g. methoxy, ethoxy), substituted or unsubstituted alkyl (e.g. methyl, trifluoromethyl), alkenyl, thioalkyl (for example, methylthio or ethylthio), substituted and unsubstituted aryl (e.g. phenyl, 5-chlorophenyl) and others known in the art. Examples of substituents for the methine groups include alkyl (preferably of from 1 to 6 carbon atoms, e.g. methyl, ethyl, etc.) aryl (e.g. phenyl). Additionally, substituents on the methine groups may form bridged linkages. The counterion, $W_1$, which is present as necessary to balance the charge of the dye molecule may include known counterions such as sodium, potassium, triethylammonium, and the like.

$R_1$ and $R_2$ may independently represent substituted or unsubstituted aryl (preferably of 6 to 15 carbon atoms), or more preferably, substituted or unsubstituted alkyl (preferably of from 1 to 6 carbon atoms). Examples of aryl include phenyl, tolyl, and the like. Examples of alkyl include methyl, ethyl, propyl, and the like, as well as substituted alkyl groups (preferably a substituted lower alkyl containing from 1 to 6 carbon atoms) such as hydroxyalkyl group (for example, 2-hydroxyethyl; or a sulfoalkyl group such as 2-sulfobutyl, 3-sulfopropyl and the like). The alkyl or aryl group may be substituted by one or more of the substituents on the above-described substituted alkyl groups. Examples of various $Z_1$ include benzamido, 2-thiophenecarboxamido, 2-furancarboxamido 3-pyrrolecarboxamido, phenylcarbamoyl, 4-acetamidophenyl, 3-acetamidophenyl.

Examples of non-aromatic $Z_2$ are halogen (e.g., chloro, fluoro, bromo), alkoxy (e.g. methoxy, ethoxy), substituted or unsubstituted alkyl (e.g. methyl, trifluoromethyl), and the like. Alternatively, $Z_2$ can independently be a substituted or unsubstituted aromatic ring that is fused with or appended to $X_2$, such as phenyl, naptho, etc., in which case, if n is equal to 1 or 2, $R_1$ and $R_2$ are also preferably 2-sulfoethyl groups. However, it is preferred that $Z_2$ is a non-aromatic substituent since, as shown by the Examples below, such dyes generally tend to produce less dye stain.

Any of the classes of sensitizing dyes of the present invention, and photographic elements containing them, may optionally exclude the furan or pyrrole substituted dyes of U.S. patent application Ser. No. 07/978,568 "Furan or Pyrrole Substituted Dye Compounds and Silver Halide Photographic Elements Containing Such Dyes" by Parton et al. filed the same day as this application. The foregoing application is incorporated in the present application by reference.

Examples of compounds according to formula I include those listed in Table I:

TABLE I

| Dye | $Z_1$ | $Z_2$ | $R_1,R_2^a$ |
|---|---|---|---|
| I-1 | benzamido (PhC(O)NH—) | Cl | 3SB,SP |
| I-2 | " | Cl | SP,SP |
| I-3 | " | F | SP,SP |
| I-4 | " | F | 3SB,SP |
| I-5 | " | $=Z_1$ | SE,SE |
| I-6 | 4-acetamidophenyl (MeC(O)NH-C6H4—) | Cl | SP,SP |
| I-7 | " | Cl | 3SB,SP |
| I-8 | " | Cl | SE,SP |
| I-9 | " | F | SE,SP |
| I-10 | " | F | SP,SP |
| I-11 | " | $=Z_1$ | SE,SE |
| I-12 | " | Br | SE,SP |
| I-13 | 3-acetamidophenyl | Cl | 3SB,SP |
| I-14 | " | F | 3SB,SP |
| I-15 | " | $=Z_1$ | SE,SE |
| I-16 | 2-hydroxybenzamido (salicylamido) | Cl | 3SB,SP |

TABLE I-continued

| Dye | Z₁ | Z₂ | R₁,R₂[a] |
|---|---|---|---|
| I-17 | " | Cl | Et,SP |
| I-18 | " | F | 3SB,SP |
| I-19 | " | =Z₁ | SE,SE |
| I-20 | 2,6-dihydroxybenzamido (–NH–C(=O)–C₆H₃(OH)₂) | Cl | 4SB,SP |
| I-21 | thiophene-2-carboxamido (–NH–C(=O)–(2-thienyl)) | Cl | 3SB,SP |
| I-22 | " | =Z₁ | SE,SE |
| I-23 | furan-2-carboxamido (–NH–C(=O)–(2-furyl)) | Cl | 4SB,4SP |
| I-24 | " | Cl | SP,SP |
| I-25 | " | Cl | Et,SP |
| I-26 | " | F | 4SB,SP |
| I-27 | " | F | SP,SP |
| I-28 | " | F | Et,SP |
| I-29 | " | =Z₁ | SE,SE |
| I-30 | " | Br | 4SB,SP |
| I-31 | pyrrole-2-carboxamido (–NH–C(=O)–(2-pyrrolyl)) | Cl | 3SB,SP |
| I-32 | " | Cl | SP,SP |
| I-33 | " | F | 3SB,SP |
| I-34 | " | Br | SP,SP |
| I-36 | " | I | SP,SP |
| I-37 | acetanilido (–NH–C₆H₄–NHC(=O)–) | Cl | SP,SP |
| I-38 | 3-hydroxybenzamido (–NH–C(=O)–C₆H₄(OH)) | Cl | SP,SP |
| I-41 | benzamido (–NH–C(=O)–C₆H₅) | =Z₁ | SP,SP |
| I-42 | furan-2-carboxamido (–NH–C(=O)–(2-furyl)) | =Z₁ | SP,SP |

Structure: benzothiazole-based trimethine cyanine dye with Et substituent at meso position, Z₁ and Z₂ substituents on the benzothiazole rings, and R₁, R₂ on the nitrogens.

TABLE I-continued

| Dye | $Z_1$ | $Z_2$ | $R_1,R_2$[a] |
|---|---|---|---|
| I-46 | pyrrole-2-C(O)NH- | Cl | 3SB,SP |
| I-47 | " | F | SP,SP |
| I-48 | furan-2-C(O)NH- | Cl | SP,SP |
| I-49 | " | F | SP,SP |
| I-50 | thiophene-2-C(O)NH- | F | SP,SP |
| I-51 | PhC(O)NH- | Cl | 4SB,SP |
| I-39 | 2-HO-C$_6$H$_4$-C(O)NH- | =$Z_1$ | SP,SP |
| I-52 | 4-(MeC(O)NH)C$_6$H$_4$- | Cl | SP,SP |
| I-53 | 4-(HOCH$_2$C(O)NH)C$_6$H$_4$- | Cl | SP,SP |
| I-54 | 3-(CH$_3$C(O)N(Me))C$_6$H$_4$- | Cl | SP,SP |

[structure: bis-benzothiazole cyanine dye with 5,5-dimethylcyclohexenyl bridge, bearing $Z_1$, $Z_2$, $R_1$, $R_2$ substituents]

| Dye | $Z_1$ | $Z_2$ | $R_1,R_2$[a] |
|---|---|---|---|
| I-58 | 5-(pyrrole-2-C(O)NH-) | H | SP,Et |
| I-59 | " | " | SP,SP |
| I-60 | 5-(furan-2-C(O)NH-) | H | SP,Et |
| I-61 | " | " | SP,SP |
| I-62 | " | 6'-Me | SP,SP |

TABLE I-continued

| Dye | Z₁ | Z₂ | R₁,R₂$^a$ |
|---|---|---|---|
| I-63 | 5-  (benzamide: PhC(O)NH-) | 5' = Z1 | SP,SP |

"5-" Indicates Z1 on the 5- position of the benzo ring

[Structure: bis-benzothiazole cyanine dye with Me,Me-substituted cyclohexenyl linker; Z₁ and Z₂ on benzo rings; N⁺–R₁ and N–R₂]

| Dye | Z₁ | Z₂ | R₁,R₂$^a$ |
|---|---|---|---|
| I-66 | H | 5- (pyrrole-2-carboxamide, NH-C(O)-NH-) | SP,SP |
| I-67 | 5-Cl | " | Et,SP |
| I-68 | H | 5- (furan-2-carboxamide, O-C(O)-NH-) | " |
| I-69 | 5-Cl | " | SP,SP |

[Structure: bis-benzothiazole monomethine cyanine dye with Z₁ and Z₂ on benzo rings; N⁺–R₁ and N–R₂]

| Dye | Z₁ | Z₂ | R₁,R₂$^a$ |
|---|---|---|---|
| I-35 | 2-hydroxybenzamide (salicylamide: 2-OH-C₆H₄-C(O)NH-) | Cl | SP,SP |
| I-70 | pyrrole-2-carboxamide (NH-C(O)-NH-) | Cl | 3SB,SP |
| I-71 | " | F | |
| I-72 | furan-2-carboxamide (O-C(O)-NH-) | Cl | SP,SP |
| I-73 | " | F | |
| I-74 | thiophene-2-carboxamide (S-C(O)-NH-) | F | SP,SP |
| I-75 | benzamide (PhC(O)-NH-) | F | SP,SP |
| I-76 | 4-(MeC(O)NH)-C₆H₄- | F | SP,SP |

In all Tables, SE is 2-sulfoethyl, SP is 3-sulfopropyl, 3SB is 3-sulfobutyl, 4SB is 4-sulfobutyl.

Dye precursors can be made by techniques that are well-known in the art. For example, reaction of a 5-amino base with an aromatic (B) acid chloride affords an aromatic amide-substituted base.

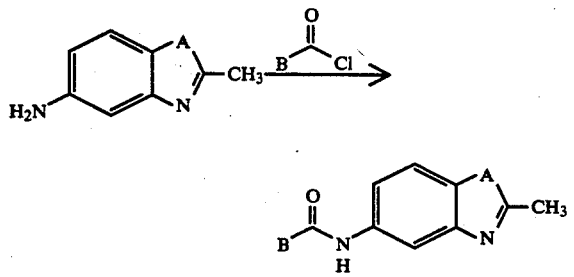

Nitration of an aromatic (Ar) substituted base followed by reduction affords an amine. Reaction with an acid chloride affords an amide-substituted aromatic base.

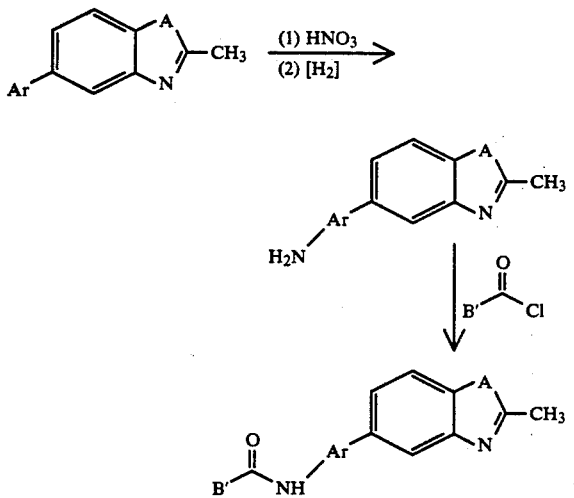

Dyes of formula I can be prepared from the above dye precursers according to techniques that are well-known in the art, such as described in Hamer, *Cyanine Dyes and Related Compounds*, 1964 (publisher John Wiley & Sons, New York, N.Y.) and James, *The Theory of the Photographic Process* 4th edition, 1977 (Easktman Kodak Company, Rochester, N.Y.). The amount of sensitizing dye that is useful in the invention is preferably in the range of 0.1 to 4.0 millimoles per mole of silver halide and more preferably from 0.2 to 2.2 millimoles per mole of silver halide. Optimum dye concentrations can be determined by methods known in the art.

The silver halide used in the photographic elements of the present invention may be silver bromoiodide, silver bromide, silver chloride, silver chlorobromide, and the like. The silver halide used in the photographic elements of the present invention preferably contains at least 90% silver chloride or more (for example, at least 95%, 98%, 99% or 100% silver chloride). In particular, the possibility is also contemplated that the silver chloride could be treated with a bromide solution to increase its sensitivity, although the bulk concentration of bromide in the resulting emulsion will typically be no more than about 2 to 2.5% and preferably between about 0.6 to 1.2% (the remainder being silver chloride). The foregoing % figures are mole %.

The photographic elements of the present invention preferably use the sensitizing dye with tabular grain emulsions. Tabular silver halide grains are grains having two substantially parallel crystal faces that are larger than any other surface on the grain. Tabular grain emulsions are those in which greater than 50 percent of the total projected area of the emulsion grains are accounted for by tabular grains having a thickness of less than 0.3 µm (0.5 µm for blue sensitive emulsion) and an average tabularity (T) of greater than 25 (preferably greater than 100), where the term "tabularity" is employed in its art recognized usage as $T = ECD/t^2$ where
ECD is the average equivalent circular diameter of the tabular grains in µm and
t is the average thickness in µm of the tabular grains.

The grain size of the silver halide may have any distribution known to be useful in photographic compositions, and may be ether polydipersed or monodispersed.

The silver halide grains to be used in the invention may be prepared according to methods known in the art, such as those described in *Research Disclosure*, (Kenneth Mason Publications Ltd, Emsworth, England) Item 308119, December, 1989 (hereinafter referred to as *Research Disclosure I*) and James, *The Theory of the Photographic Process*. These include methods such as ammoniacal emulsion making, neutral or acid emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with compounds such as gold sensitizers (e.g., aurous sulfide) and others known in the art. Compounds and techniques useful for chemical sensitization of silver halide are known in the art and described in *Research Disclosure I* and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30° to 80° C., as illustrated in *Research Disclosure*, June 1975, item 13452 and U.S. Pat. No. 3,772,031.

The silver halide may be sensitized by dyes of the present invention by any method known in the art, such as described in *Research Disclosure I*. The dye may be added to an emulsion of the silver halide grains and a hydrophilic colloid at any time prior to (e.g., during or after chemical sensitization) or simultaneous with the coating of the emulsion on a photographic element. The dye/silver halide emulsion may be mixed with a dispersion of color image-forming coupler immediately before coating or in advance of coating (for example, 2 hours). Essentially any type of emulsion (e.g., negative-working emulsions such as surface-sensitive emulsions or unfogged internal latent image-forming emulsions, direct-positive emulsions such as surface fogged emulsions, or others described in, for example, *Research Disclosure I*) may be used. The above-described sensitizing dyes can be used alone, or may be used in combination with other sensitizing dyes, e.g. to also provide the silver halide with sensitivity to wavelengths of light outside the green region or to supersensitize the silver halide.

Other addenda in the emulsion may include antifoggants, stabilizers, filter dyes, light absorbing or reflecting pigments, vehicle hardeners such as gelatin hardeners, coating aids, dye-forming couplers, and development modifiers such as development inhibitor releasing couplers, timed development inhibitor releasing couplers, ultraviolet absorbers, bleach accelerators, and the like. These addenda and methods of their inclusion in emulsion and other photographic layers are well-known in the art and are disclosed in *Research Disclosure I* and the references cited therein. The emulsion may also include brighteners, such as stilbene brighteners. Such brighteners are well-known in the art and are used to counteract dye stain, although the dyes of the present invention generally have low dye stain even if no brightener is used.

The emulsion layer containing silver halide sensitized with a dye of the present invention can be coated simultaneously or sequentially with other emulsion layers, subbing layers, filter dye layers, interlayers, or overcoat layers, all of which may contain various addenda known to be included in photographic elements. These include antifoggants, oxidized developer scavengers, DIR couplers, antistatic agents, optical brighteners, light-absorbing or light-scattering pigments, and the like. The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

Photographic elements of the present invention can be black and white but are preferably color. A color photographic element generally contains three silver emulsion layers or sets of layers (each set of layers often consisting of emulsions of the same spectral sensitivity but different speed): a blue-sensitive layer having a yellow dye-forming color coupler associated therewith; a green-sensitive layer having a magenta dye-forming color coupler associated therewith; and a red-sensitive layer having a cyan dye-forming color coupler associated therewith. Those dye forming couplers are provided in the emulsion typically by first dissolving or dispersing them in a water immiscible, high boiling point organic solvent, the resulting mixture then being dispersed in the emulsion. Suitable solvents include those in European Patent Application 87119271.2. Dye-forming couplers are well-known in the art and are disclosed, for example, in *Research Disclosure I*.

Photographic elements comprising the composition of the invention can be processed in any of a number of well-known photographic processes utilizing any of a number of well-known processing compositions, described, for example, in *Research Disclosure I*, or in James, *The Theory of the Photographic Process* 4th, 1977.

The invention is describe further in the following Examples.

Synthesis Example 1- Synthesis of Dye I-23

Intermediate A:
5-(2-Furancarboxamido)-2-methylbenzoxazole

5-Amino-2-methylbenzoxazole (14 8 g, 0.100 mol) and 2,6-lutidine (12.0 g, 0.111 mol) were combined with 100 mL of tetrahydrofuran (THF) and the solution was cooled to 3° C. in an ice-bath under nitrogen. 2-Furoyl chloride (13.7 g, 0.105 mol) in 20 mL of THF was added dropwise so as to keep the temperature below 10° C. After addition the ice-bath was removed and after stirring for 1 hour the mixture was poured into 300 mL of water. The solid was collected and washed with water and dried. This afforded 21.1 g (87% yield) of product; m.p. 156°–158° C.

Intermediate B:
Anhydro-5-(2-furancarboxamido)-2-methyl-3-(4-sulfobutyl)benzoxazolium hydroxide 5-(2-Furancarboxamido)-2-methylbenzoxazole (5.0 g, 0.021 mol) was combined with 1,4-butanesultone (3.0 mL, 0.029 mol) and 5 mL of butyronitrile and heated at reflux for 21 hours. The solid formed was collected and washed with acetone and dried (4.1 g, 52% yield).

Preparation of
Anhydro-5-chloro-9-ethyl-5'-(2-furancarboxamido)-3'-(4-sulfobutyl)-3-(3-sulfopropyl)oxacarbocyanine hydroxide triethylammonium salt (Dye I-23)

Anhydro-5-(2-furancarboxamido)-2-methyl-3-(4-sulfobutyl)benzoxazolium hydroxide (2.5 g, 6.65 mmol) was combined with anhydro-5-chloro-2-(2-ethoxybutenyl)-3(3-sulfopropyl)benzoxazolium hydroxide (2.5 g, 6.68 mmol) and 20 mL of m-cresol and heated to 127° C. Triethylamine (5 mL) was added and the mixture was heated for 5 min. with stirring. The mixture was removed from the heat, chilled in an ice-bath, and diluted with ether. The orange oil that formed was dissolved in 50 mL of ethanol and potassium acetate (2.5 g) was added. The product precipitated and was collected. The dye was purified by treatment with hot methanol and then by dissolving it in m-cresol and methanol and re-precipitating it by adding acetone. This afforded 580 mg (12% yield) of dye; $\lambda$-max=502 nm (MeOH), e-Max=$14.5 \times 10^4$.

Analysis Calculated for: $C_{31}H_{31}ClO_{10}N_3S_2K$-1.5 $H_2O$: C, 48.23; H, 4.41; N, 5.44. Found: C, 48..21; H, 4.39; N, 5.37.

Photographic Evaluation Example 1

Black and white photographic materials were prepared by coating a polyester support with a silver halide emulsion layer containing chemically-sensitized 0.2 μm cubic silver bromoiodide (2.6 mol % I) at 10.8 mg Ag/dm², hardened gelatin at 73 mg/dm², and sensitizing dye as identified in the Table III at 0.8 mole/mole Ag. The elements were given a wedge spectral exposure and processed in RP X-OMAT (a trademark) chemistry (a developer containing hydroquinone and p-methylaminophenol as developing agents; this type of processing chemistry is described further in U.S. Pat. No. 4,900,652).

The photographic speed of the dyes is reported in terms of a sensitizing ratio (SR), which is defined as the speed at λ-max (in log E units multiplied by 100) minus the intrinsic speed of the dyed emulsion at 400 nm (in log E units multiplied by 100) plus 200. This measurement of speed allows for comparison while using a uniform chemical sensitization that is not optimized for each sensitizing dye. The λ-max was determined from absorptance measurements.

Black and white stain was measured by placing the processed film in front of a scanning spectrophotometer. The total transmission was measured between 400 and 900 run. This data was plotted as absorbance ($-\log 1/T$). The stain was then calculated as the maximum absorbance at any wavelength in the range (Table IV).

Materials identified as "color" were prepared by coating a polyester support with a silver halide emulsion layer containing chemically-sensitized 0.7 μm (equivalent circular diameter) polymorphic silver bromoiodide (6 mole % I) at 16 mg Ag/dm², hardened gelatin at 63 mg/dm², 4-hydroxy-6-methyl-1,3,3a,7-tetraazaindene antifoggant at 5 mg/dm², a coupler (shown below) at 14 mg/dm² in the coupler solvent di-m-butylphthalalate (8 mg/dm²) and sensitizing dye as identified in Table IV at 0.4 mmole/mole Ag. The elements were given a wedge spectral exposure and coatings were processed in Kodak C-41 ® processing. The photographic speed of the dyes is reported in Table V as well as the sensitizing ratio (SR).

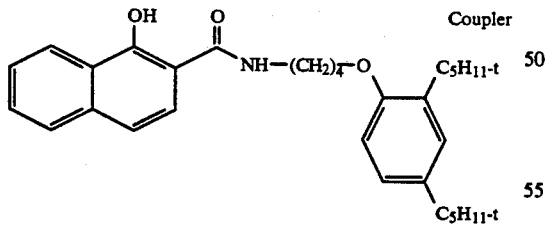

Coupler

Color stain was obtained by processing unexposed color coatings for 3.5 minutes at 33° C. in the processing solution described below, followed by 1.5 minutes in a bleach-fix solution, and then a 3.5 minute wash. Stain was measured by placing the processed film in front of a scanning spectrophotometer. The stain was calculated as the maximum absorbance at any wavelength in the range 400-900 nm (Table V). In some cases, where more than one absorption peak was observed, the stain was calculated as the maximum absorbances at the wavelengths of the respective peaks.

| Processing Solution | |
|---|---|
| benzyl alcohol | 14.2 mL |
| potassium carbonate | 28 g |
| 45% potassium sulfite | 2.75 mL |
| triethanolamine | 11 mL |
| hydroxylamine sulfate | 3.2 g |
| potassium bromide | 0.58 g |
| potassium chloride | 0.13 |
| lithium chloride | 0.13 |
| anticalcium agent | 0.8 Ml |
| water to make | 1.0 L |
| pH adjusted to | 10.08 |

All the dyes effectively sensitized the silver halide emulsions in which they were used. Comparison dyes are shown in Table II below. Stain figures are shown as Optical Density ("OD")×10³.

TABLE II

| | Comparison Dye Structures | | |
|---|---|---|---|
| Dye | $Z_1$ | $Z_2$ | $R_1,R_2^a$ |

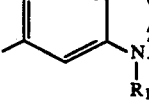

| Dye | $Z_1$ | $Z_2$ | $R_1,R_2^a$ |
|---|---|---|---|
| C-1 |  | Cl | 3SB,SP |
| C-2 | " | F | SP,SP |
| C-3 | " | $=Z_1$ | 3SB,3SB |
| C-4 | " | $=Z_1$ | SE,SE |
| C-18 | Me—C(=O)—NH— | $=Z_1$ | SP,SP |

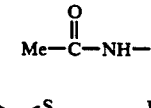

| Dye | | | |
|---|---|---|---|
| C-20 | 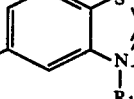 | $=Z_1$ | SP,SP |

| Dye | | | |
|---|---|---|---|
| C-19 | 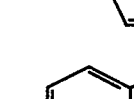 | Cl | SP,SP |

ᵃSE is 2-sulfoethyl, SP is 3-sulfopropyl, 3SB is 3-sulfobutyl.

TABLE III

| Dye Speed in the B & W Format | | | | | |
|---|---|---|---|---|---|
| Dye | λmax | SR | Dye | λmax | SR |
| C-1 | 547 | 250 | I-3 | 537 | 238 |
| I-1 | 542 | 249 | I-4 | 540 | 240 |
| I-2 | 541 | 243 | I-9 | 542 | 229 |

TABLE III-continued

Dye Speed in the B & W Format

| Dye | λmax | SR | Dye | λmax | SR |
|---|---|---|---|---|---|
| I-6 | 530 | 229 | I-10 | 530 | 231 |
| I-7 | 538 | 236 | I-14 | 527 | 222 |
| I-8 | 546 | 242 | I-18 | 542 | 241 |
| I-13 | 541 | 238 | I-26 | 543 | 241 |
| I-16 | 541 | 247 | I-27 | 535 | 231 |
| I-20 | 541 | 237 | I-33 | 537 | 242 |
| I-21 | 546 | 249 | C-4 | 547 | 244 |
| I-23 | 547 | 248 | I-5 | 539 | 236 |
| I-24 | 545 | 245 | I-11 | 492 | 232 |
| I-31 | 548 | 247 | I-15 | 543 | 247 |
| I-32 | 546 | 249 | I-19 | 539 | 244 |
| I-37 | 541 | 263 | I-22 | 495 | 231 |
| I-38 | 544 | 254 | I-29 | 545 | 244 |
| C-2 | 538 | 235 | | | |
| (Miscellaneous. Dyes). | | | | | |
| I-12 | 547 | 249 | C-3 | 545 | 245 |
| I-17 | 542 | 242 | I-41 | 537 | 239 |
| I-30 | 546 | 257 | I-42 | 542 | 229 |
| I-34 | 546 | 254 | | | |
| I-35 | 465 | 225 | | | |
| I-36 | 546 | 249 | | | |

TABLE IV

Dye Stain in the B & W Format

| Dye | λmax | OD × 10³ | Dye | λmax | OD × 10³ |
|---|---|---|---|---|---|
| C-1 | 508 | 48 | I-4 | 505 | 42 |
| I-1 | 510 | 41 | I-9 | 508 | 46 |
| | 543 | 31 | | | |
| I-2 | 510 | 41 | I-10 | 508 | 50 |
| | 550 | 61 | | | |
| I-6 | 510 | 47 | I-14 | 505 | 44 |
| I-7 | 508 | 51 | I-18 | 508 | 39 |
| I-8 | 508 | 50 | I-26 | 508 | 38 |
| I-13 | 508 | 47 | I-27 | 508 | 40 |
| I-16 | 508 | 32 | I-33 | 508 | 30 |
| | 540 | 42 | | | |
| I-20 | 490 | 27 | C-4 | 505 | 32 |
| | 510 | 30 | | 540 | 17 |
| I-21 | 510 | 64 | I-5 | 540 | 91 |
| | 543 | 88 | | 510 | 71 |
| I-23 | 510 | 41 | I-11 | 500 | 84 |
| | | | | 525 | 78 |
| I-24 | 508 | 46 | I-15 | 485 | 30 |
| | 550 | 41 | | 510 | 36 |
| I-31 | 510 | 24 | I-19 | 540 | >100 |
| | 540 | 20 | | | |
| I-32 | 510 | 47 | I-22 | 490 | 50 |
| | 490 | 35 | | 510 | 45 |
| C-2 | 504 | 48 | I-29 | 512 | 57 |
| I-3 | 510 | 36 | | | |
| (Miscellaneous. dyes) | | | | | |
| C-3 | 545 | 79 | I-12 | 510 | 39 |
| | 505 | 58 | | | |
| I-41 | 540 | >100 | I-17 | 515 | 40 |
| I-42 | 490 | 44 | I-30 | 510 | 41 |
| | 515 | 55 | | | |
| C-18 | 510 | 13 | I-34 | 510 | 44 |

TABLE V

Dye Speed and Stain in the Color Format

| | Sensitization | | | Stain | |
|---|---|---|---|---|---|
| Dye | λmax | Speed | SR | λmax | OD10³ |
| C-1 | 550 | 197 | 233 | 510 | 37 |
| I-2 | 540 | 179 | 224 | 510 | 12 |
| I-8 | 550 | 192 | 226 | 510 | 13 |
| I-16 | 550 | 199 | 220 | 510 | 10 |
| I-24 | 540 | 180 | 214 | 510 | 3 |
| I-32 | 550 | 193 | 227 | 510 | 7 |
| I-37 | 540 | 188 | 228 | 505 | 12 |
| C-2 | 540 | 188 | 223 | 508 | 19 |
| I-3 | 540 | 192 | 218 | 510 | 5 |
| I-14 | 540 | 176 | 209 | 508 | 8 |
| I-26 | 540 | 185 | 212 | 510 | 2 |

TABLE V-continued

Dye Speed and Stain in the Color Format

| | Sensitization | | | Stain | |
|---|---|---|---|---|---|
| | λmax | Speed | SR | λmax | OD10³ |
| C-4 | 550 | 197 | 240 | 512 | 50 |
| | | | | 545 | 17 |
| I-29 | 550 | 194 | 223 | 515 | 4 |
| C-3 | 550 | 186 | 233 | 512 | 46 |
| | | | | 550 | 105 |
| I-8 | 540 | 191 | 219 | 510 | 44 |
| | | | | 545 | 89 |
| I-15 | 540 | 157 | 211 | 510 | 9 |
| C-20 | 630 | 142 | 189 | 582 | 65 |
| I-39 | 550 | 114 | 151 | 580 | 18 |
| C-19 | 470 | 186 | 223 | 465 | 68 |
| I-35 | 470 | 191 | 219 | 465 | 34 |
| C-18 | — | — | * | — | 0 |
| I-43 | 550 | 190 | 221 | 512 | 24 |
| I-44 | 550 | | 223 | 512 | 53 |

*Did not sensitize

The data presented in Tables III–V indicate that the dyes used according to the invention provided effective sensitization and gave significantly lower post-processing stain than the comparison dyes, particularly in the color format which contained the water-immiscible emulsion of color coupler into which the sensitizing dyes could at least partially migrate.

The invention has been described in detail with particular reference to preferred embodiments, but it will be understood that variations and modifications can be effected within the spirit and scope of the invention.

What is claimed is:

1. A silver halide photographic element comprising a silver halide emulsion containing a sensitizing dye having the formula:

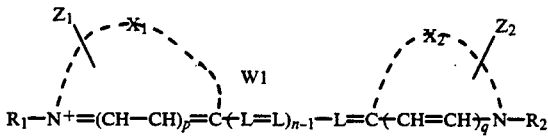

$X_1$ and $X_2$ each independently represent the atoms necessary to complete a benzo-condensed 5- or 6-membered heterocyclic nucleus, which, in addition to being substituted by $Z_1$ and $Z_2$ respectively, may be further substituted or unsubstituted;

n is a positive integer from 1 to 4, p and q each independently represents 0 or 1, each L independently represents a substituted or unsubstituted methine group;

$R_1$ and $R_2$ each independently represents substituted or unsubstituted aryl or substituted or unsubstituted alkyl, $Z_2$ represents H or a substituent;

$Z_1$ has the formula $Y_1$—$CONR_3$—*; $R_5R_6N$—$CO$—$Y_2$—*; or
$R_7$—$CO$—$NR_8$—$Y_2$—* wherein * represents the bonding position to $X_1$, $Y_1$ and $Y_2$ are substituted or unsubstituted aromatic rings and $R_3$, $R_4$, $R_5$, $R_6$, $R_7$ and $R_8$ are independently H or substituted or unsubstituted lower alkyl;

W1 is a counterion as needed to balance the charge of the molecule.

2. A silver halide photographic element according to claim 1 wherein $Z_2$ is a non-aromatic substituent.

3. A photographic element according to claim 1 additionally comprising a water-immiscible dispersion into which said sensitizing dye can at least partially migrate.

4. A photographic element according to claim 1 wherein the silver halide emulsion is a tabular grain emulsion wherein at least 50% of the grain population is accounted to by tabular grains that satisfy the formula $ECD/t^2 > 25$, wherein ECD represents the average equivalent circular diameter of the tabular grains in micrometers, and t represents the average thickness of the grains in micrometers.

5. A photographic element according to claim 1 wherein the aromatic ring is selected from benzene, furan, pyrrole and thiophene rings.

6. A silver halide photographic element according to claim 1, wherein the dye has the formula:

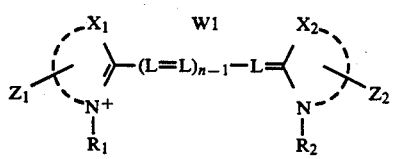

$X_1$ and $X_2$ independently represent the atoms necessary to complete a benzothiazole nucleus, benzoxazole nucleus, benzoselenazole nucleus, benzotellurazole nucleus, quinoline nucleus or benzimidazole nucleus, which, in addition to being substituted by $Z_1$ and $Z_2$ respectively, may be further substituted or unsubstituted.

7. A silver halide photographic material according to claim 1, wherein the dye has the formula:

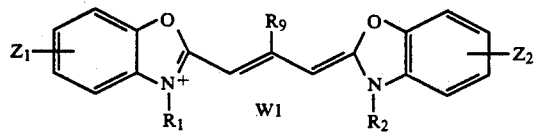

wherein $R_1$ and $R_2$ represent lower alkyl at least one of which is substituted with an acid or acid salt group, $R_9$ is a lower alkyl, $Z_2$ is H, substituted or unsubstituted lower alkyl, substituted or unsubstituted alkenyl, halogen, or alkoxy and $Z_1$ has the formula $Y_1$—$CONR_3$—*; $R_5R_6N$—$CO$—$Y_2$—*; or $R_7$—$CO$—$NR_8$—$Y_2$—* wherein * represents the bonding position to the benzene ring shown, $Y_1$ and $Y_2$ are substituted or unsubstituted aromatic rings and $R_3$, $R_4$, $R_5$, $R_6$, $R_7$, and $R_8$ are independently H or substituted or unsubstituted lower alkyl, the photographic material additionally comprising a water-immiscible dispersion into which said sensitizing dye can at least partially migrate.

8. A silver halide photographic material according to claim 7 wherein both $R_1$ and $R_2$ are substituted with an acid or acid salt group.

9. A silver halide photographic material according to claim 7 wherein the dye is of the formula:

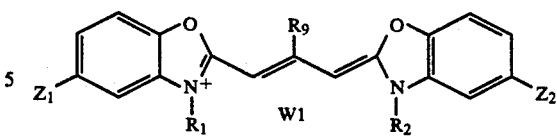

10. A photographic element according to claim 7, wherein $Z_1$ is defined by the formula $Y_1$—CONH— wherein $Y_1$ is phenyl, furan-2-yl, furan-3-yl, 1-H-pyrrol-2-yl, 1-H-pyrrol-3-yl, thiophen-2-yl, or thiophene-3-yl.

11. A photographic element according to claim 10 wherein $R_1$ and $R_2$ are both substituted with an acid or acid salt group and have from 1 to 4 carbon atoms, and wherein $R_9$ is methyl or ethyl.

12. A photographic element according to claim 7, wherein $Z_1$ is defined by the formula, G—$Y_2$— wherein $Y_2$ is 1,4-phenylene or 1,3-phenylene, G is acetamido, and $Z_2$ is a halogen.

13. A silver halide photographic element comprising a silver halide emulsion containing a sensitizing dye having the formula:

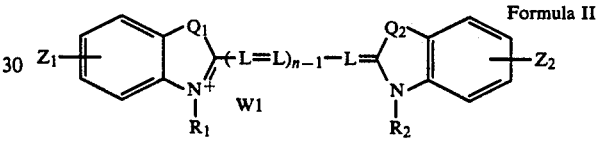

Formula II n is a positive integer from 1 to 4,
each L independently represents a substituted or unsubstituted methine group, and each of the benzene rings shown may be further substituted or unsubstituted;
$Q_1$ and $Q_2$ are, independently, O, N or S;
$R_1$ and $R_2$ each independently represents substituted or unsubstituted aryl or substituted or unsubstituted alkyl,
$Z_2$ represents H or a non-aromatic substituent;
$Z_1$ has the formula $Y_1$—$CONR_3$—*; $R_5R_6N$—$CO$—$Y_2$—*; or
$R_7$—$CO$—$NR_8Y_2$* wherein * represents the bonding position to the benzene ring shown, $Y_1$ and $Y_2$ are substituted or unsubstituted aromatic rings and $R_3$, $R_4$, $R_5$, $R_6$, $R_7$ and $R_8$ are independently H or substituted or unsubstituted lower alkyl;
$R_1$ and $R_2$ each independently represents substituted or unsubstituted aryl or substituted or unsubstituted alkyl;
W1 is a counterion as needed to balance the charge of the molecule.

14. A photographic element according to claim 13 additionally comprising a water-immiscible dispersion carrying a color coupler, into which said sensitizing dye can at least partially migrate.

15. A photographic element according to claim 13 additionally comprising a water-immiscible dispersion carrying a color coupler, into which said sensitizing dye can at least partially migrate.

16. A photographic element according to claim 13 wherein Z1 and Z2 are 5-position substituents.

17. A photographic element according to claim 13 wherein $Y_1$ is a substituted or unsubstituted benzene, furan, pyrrole or thiophene ring and $Y_2$ is a substituted or unsubstituted benzene ring.

18. A photographic element according to claim 17 additionally comprising a water-immiscible dispersion carrying a color coupler into which said sensitizing dye can at least partially migrate.

19. A photographic element according to claim 18, wherein the silver halide emulsion comprising at least 95 mole percent silver chloride.

20. A photographic element according to claim 18, wherein one of $R_1$ and $R_2$ is substituted with an acid or acid salt group.

21. A photographic element according to claim 18 wherein both of $R_1$ and $R_2$ are substituted with an acid or acid salt group.

* * * * *

UNITED STATES PATENT AND TRADEMARK OFFICE
CERTIFICATE OF CORRECTION

PATENT NO.   : 5,316,904
DATED        : May 31, 1994
INVENTOR(S) : Richard L. Parton, et. al.

It is certified that error appears in the above-indentified patent and that said Letters Patent is hereby corrected as shown below:

Col 21, line 10, delete "to" and insert --- for ---.

Col 22, line 48, delete at the end of the formula "$NR_8Y_2*$" and insert --- $NR_8Y_2$—* ---.

Col 24, line 2, delete "comprising" and insert --- comprises ---.

Signed and Sealed this

Eleventh Day of October, 1994

Attest:

BRUCE LEHMAN

Attesting Officer

Commissioner of Patents and Trademarks